Figure 7:
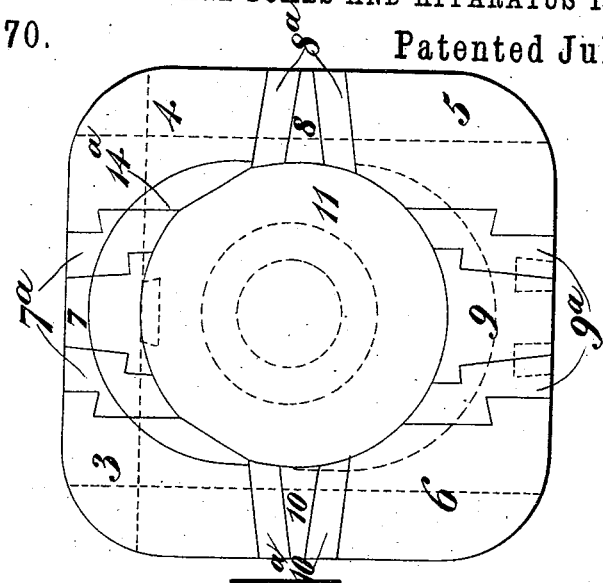

(No Model.) 11 Sheets—Sheet 1.
S. FOX.
MANUFACTURE OF AXLE BOXES AND APPARATUS THEREFOR.
No. 563,470. Patented July 7, 1896.
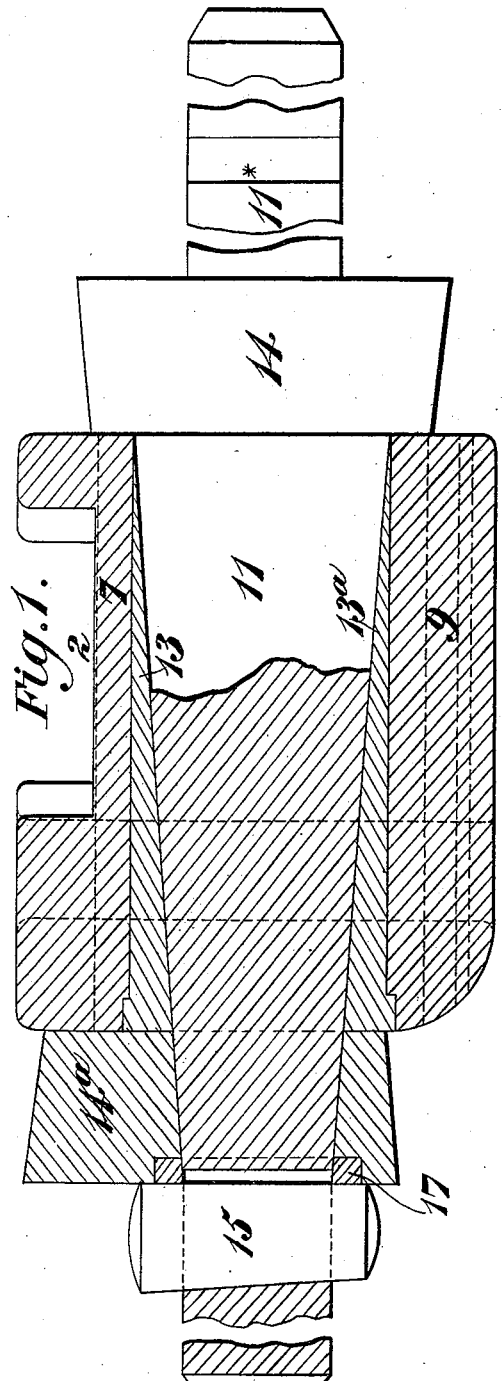
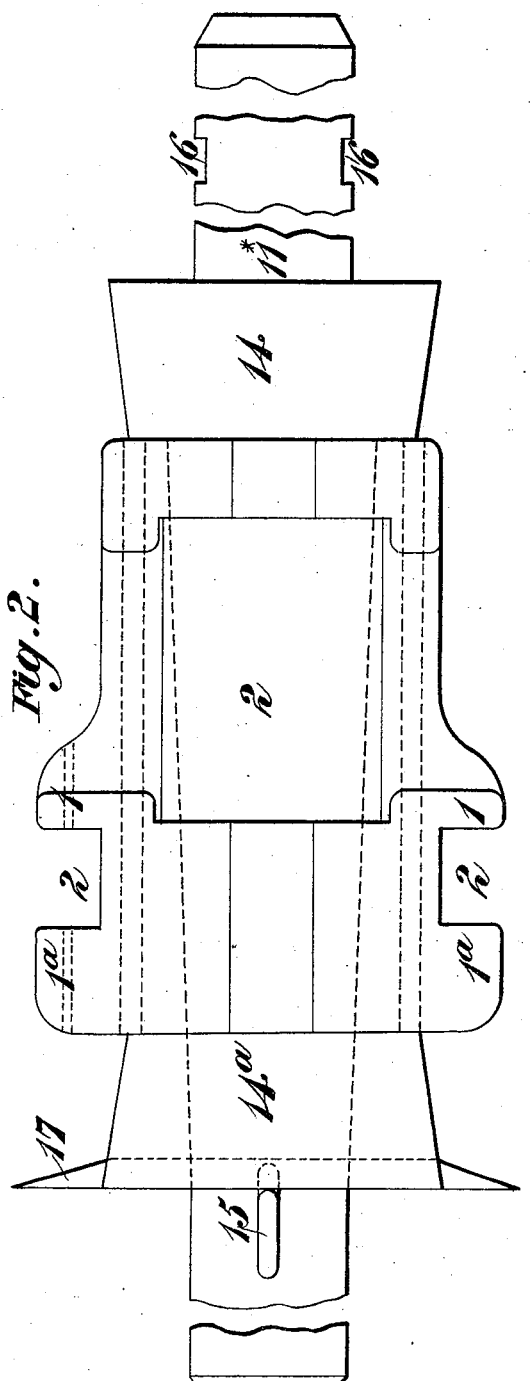
Witnesses
A. L. Croft.
J. W. Hawley
Inventor
Samson Fox (No Model.)
S. FOX.
MANUFACTURE OF AXLE BOXES AND APPARATUS THEREFOR.
No. 563,470.   Patented July 7, 1896.
11 Sheets—Sheet 2.
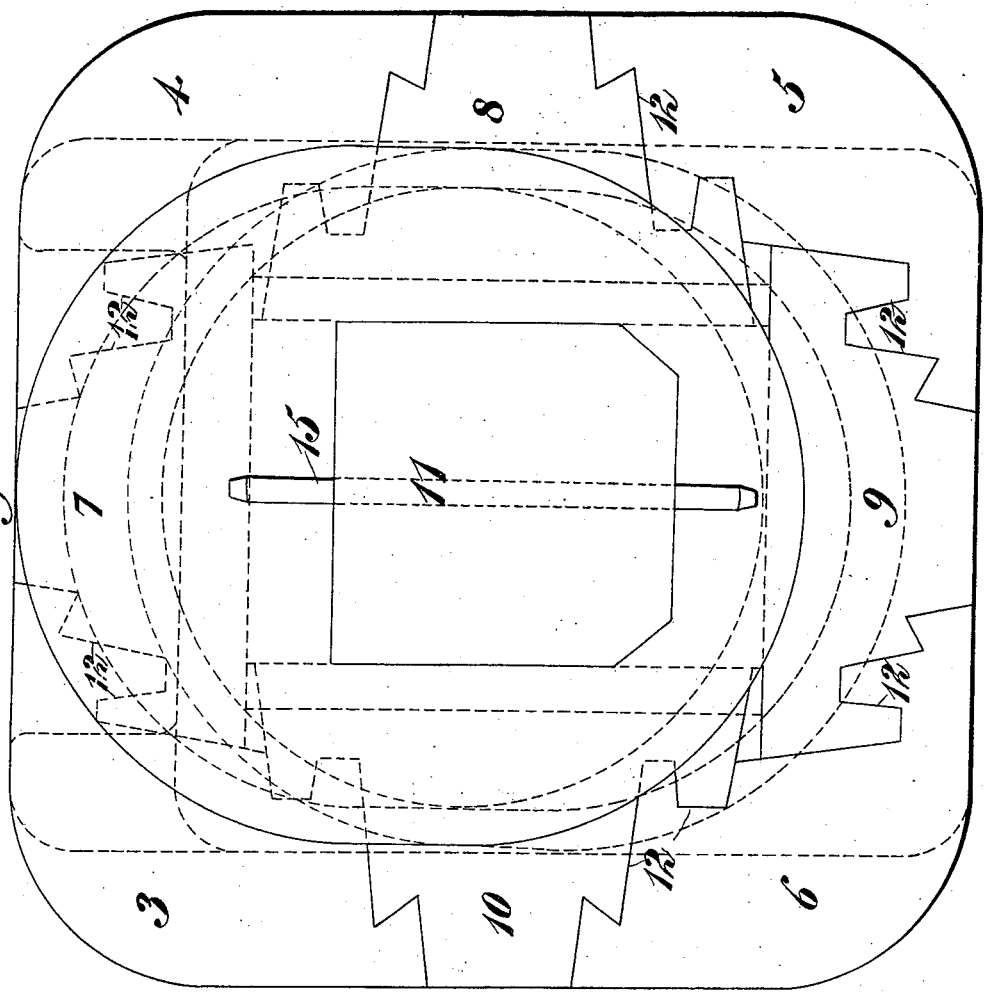
Witnesses
A. L. Croft.
J.W. Hawley
Inventor
Samuel Fox (No Model.)  11 Sheets—Sheet 3.

S. FOX.
MANUFACTURE OF AXLE BOXES AND APPARATUS THEREFOR.

No. 563,470. Patented July 7, 1896.

Witnesses
A. L. Croft
J. W. Hawley

Inventor
Samson Fox

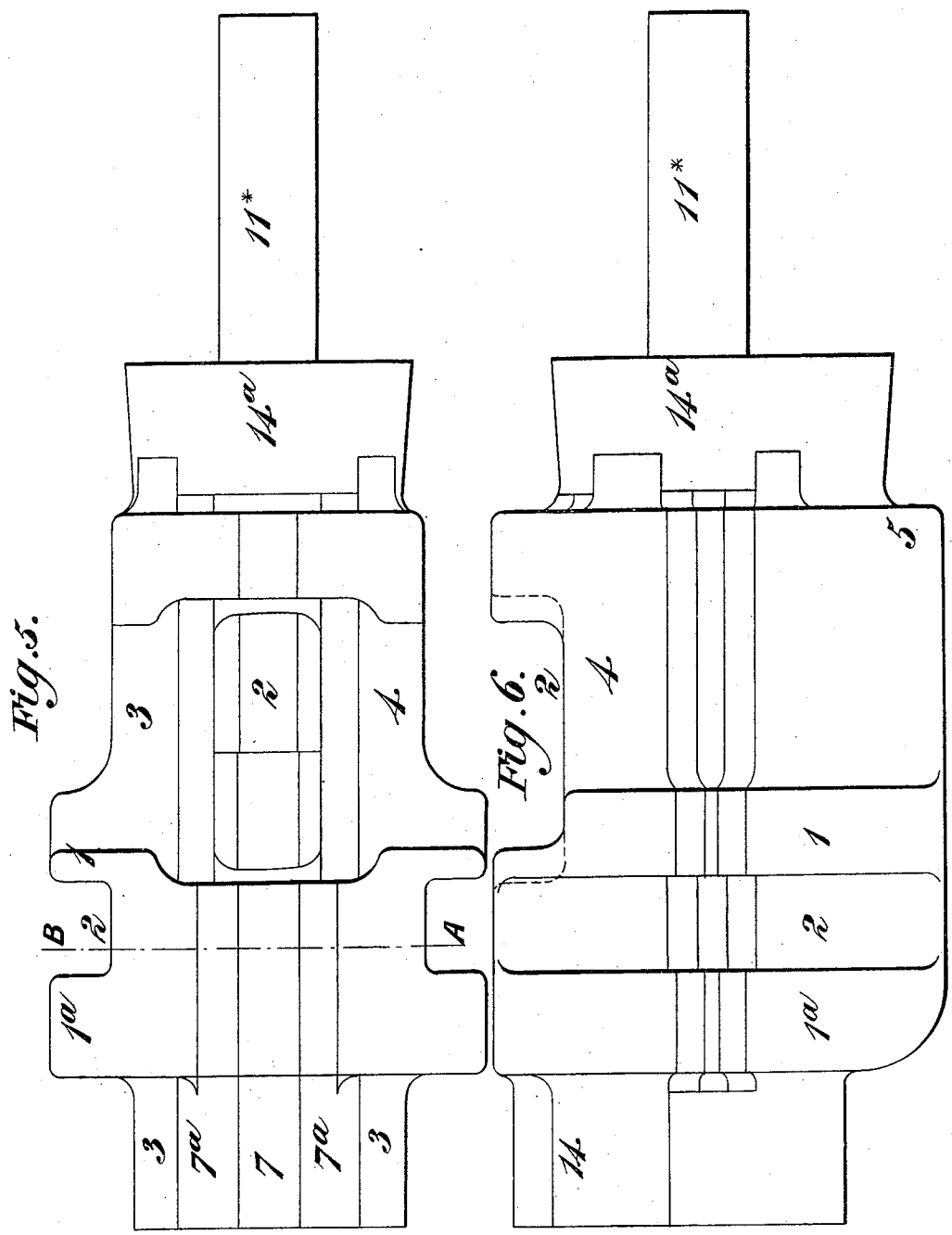

(No Model.) 11 Sheets—Sheet 5.
S. FOX.
MANUFACTURE OF AXLE BOXES AND APPARATUS THEREFOR.
No. 563,470. Patented July 7, 1896.

Witnesses
A. L. Croft
J. W. Hawley

Inventor
Samson Fox (No Model.)  
11 Sheets—Sheet 7.

S. FOX.  
MANUFACTURE OF AXLE BOXES AND APPARATUS THEREFOR.

No. 563,470.  
Patented July 7, 1896.

Witnesses  
A. L. Croft  
J. W. Hawley

Inventor  
Samson Fox

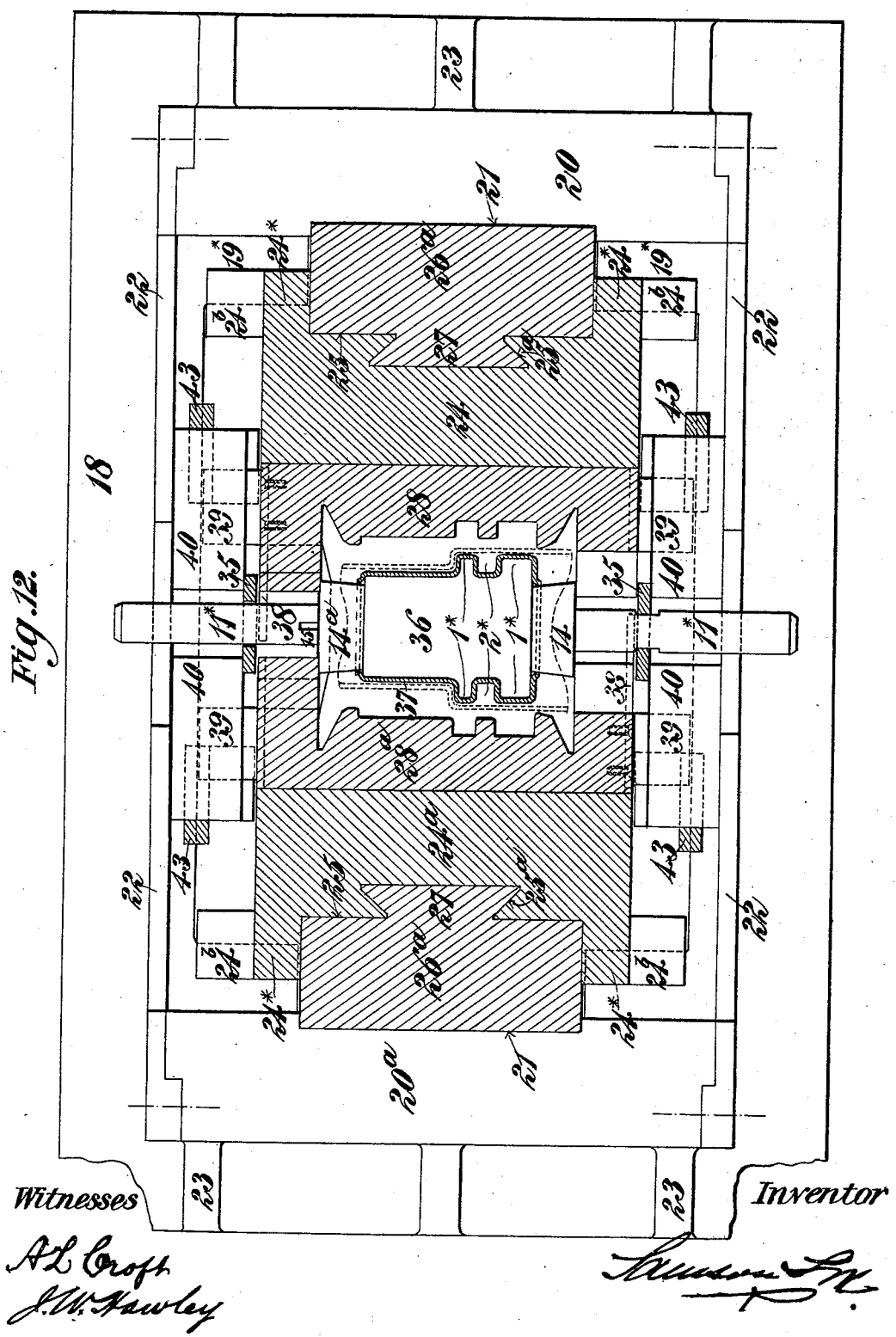

(No Model.) 11 Sheets—Sheet 9.

S. FOX.
MANUFACTURE OF AXLE BOXES AND APPARATUS THEREFOR.

No. 563,470. Patented July 7, 1896.

Witnesses
A. L. Croft.
J. W. Hawley.

Inventor
Samson Fox (No Model.)  
11 Sheets—Sheet 10.

S. FOX.
MANUFACTURE OF AXLE BOXES AND APPARATUS THEREFOR.

No. 563,470.  Patented July 7, 1896.

Witnesses  
A. L. Croft.  
J. W. Hawley.

Inventor  
Samson Fox

THE NORRIS PETERS CO., PHOTO-LITHO., WASHINGTON, D. C.

(No Model.) 11 Sheets—Sheet 11.

S. FOX.
MANUFACTURE OF AXLE BOXES AND APPARATUS THEREFOR.

No. 563,470. Patented July 7, 1896.

Witnesses
A L Croft
J W Hawley

Inventor
Samson Fox

UNITED STATES PATENT OFFICE.

SAMSON FOX, OF LEEDS, ENGLAND.

MANUFACTURE OF AXLE-BOXES AND APPARATUS THEREFOR.

SPECIFICATION forming part of Letters Patent No. 563,470, dated July 7, 1896.

Application filed April 27, 1893. Serial No. 472,059. (No model.) Patented in England July 2, 1892, No. 12,300, and in Germany April 5, 1894, No. 74,215.

*To all whom it may concern:*

Be it known that I, SAMSON FOX, a subject of the Queen of Great Britain and Ireland, residing at Leeds Forge, Leeds, in the county of York, England, have invented Improvements in the Manufacture of Axle-Boxes and in Apparatus Therefor, (upon which invention I have obtained British Letters Patent No. 12,300, dated July 2, 1892, and German Letters Patent No. 74,215, dated April 5, 1894;) and I declare that the following is a full, true, and exact description of my invention.

This invention relates to the manufacture or construction of axle-boxes for railway and other vehicles from wrought-iron or steel blooms, half-wroughts, rolled sections, and pressed or forged parts, and from metallic plate, such as wrought iron or steel. According thereto suitable metal such as mild steel or iron in one or other of the forms referred to is first converted into a tube the external and internal dimensions of which correspond roughly to that of the required axle-box, after which it is compressed to complete the formation of the axle-box. For this latter purpose I employ a collapsible mandrel or core-die (hereinafter called the "collapsible mandrel") the exterior of which corresponds in shape and dimensions with the interior of the finished axle-box to be produced and male and female dies (hereinafter called the "outer" dies) the interiors of which correspond in shape and dimensions with the exterior of the finished axle-box.

The collapsible mandrel comprises a number of outer parts or segments suitably fitted together, and a central boss or bearing-spindle the form of which is such that it can be readily withdrawn immediately the axle-box is pressed. The construction of this mandrel can be variously modified. The outer dies comprise metallic plates or parts so formed and arranged as to form in conjunction with the before-mentioned collapsible mandrel the sides, top, and bottom of the required axle-box when the tube is pressed between them. The outer dies may be actuated by any suitable means—as, for example, by a hydraulic press or similar apparatus.

The compressing of the box or tube to the required shape can be effected by one or more operations, as may be desired.

Figure 4:
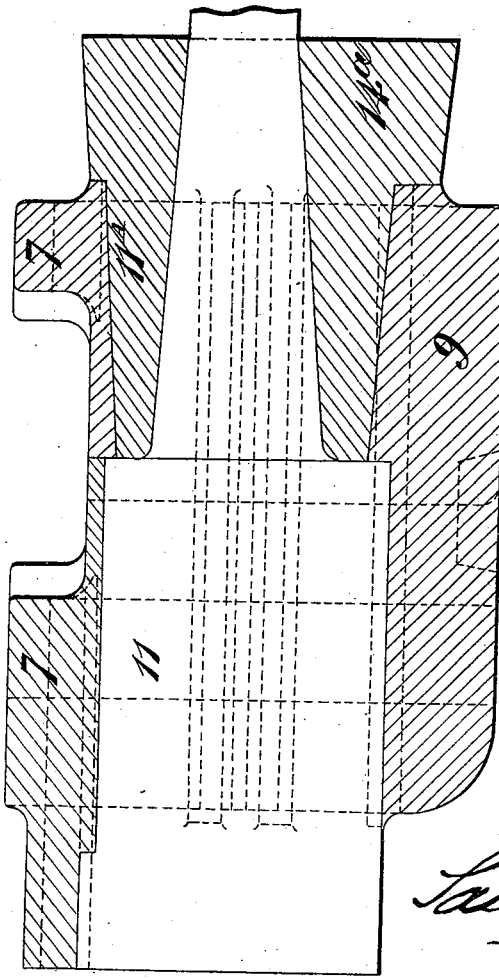
Figure 8:
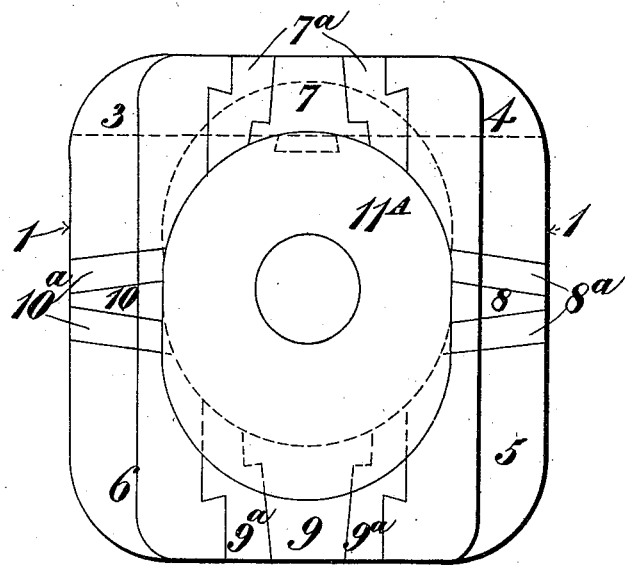
Figure 9:
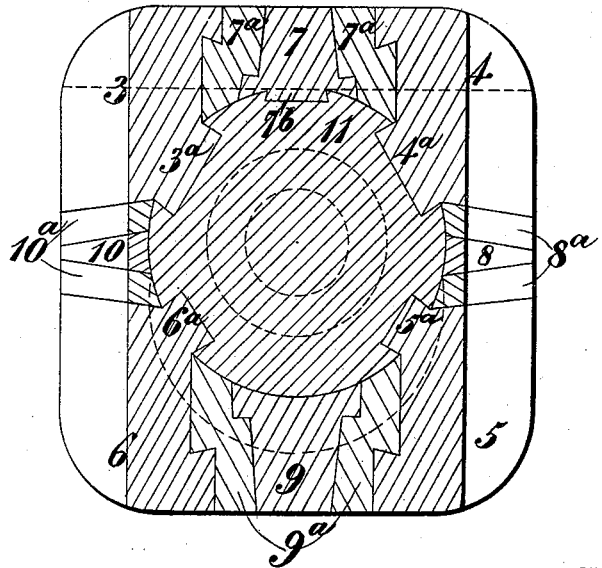
Figure 10:
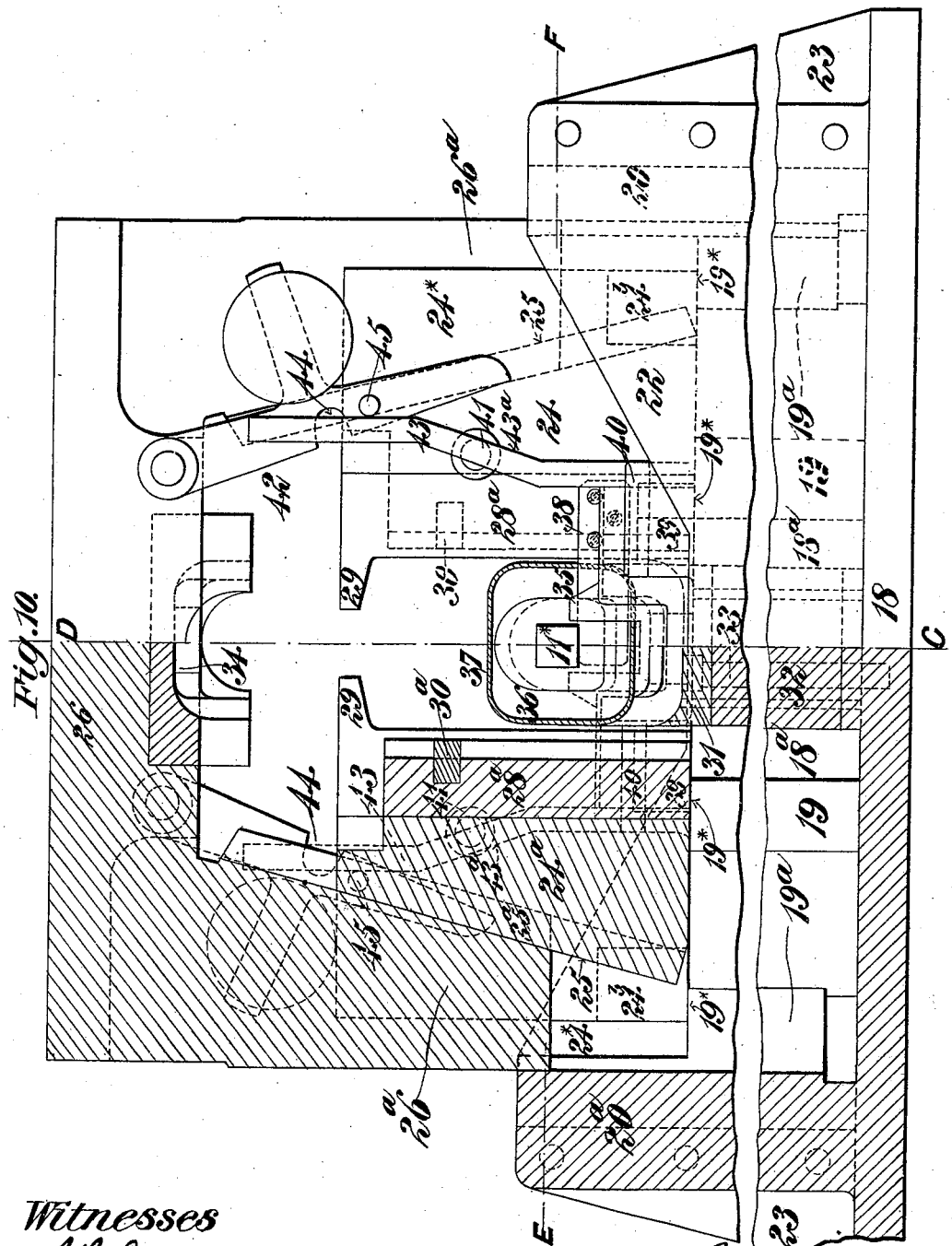
Figure 11:
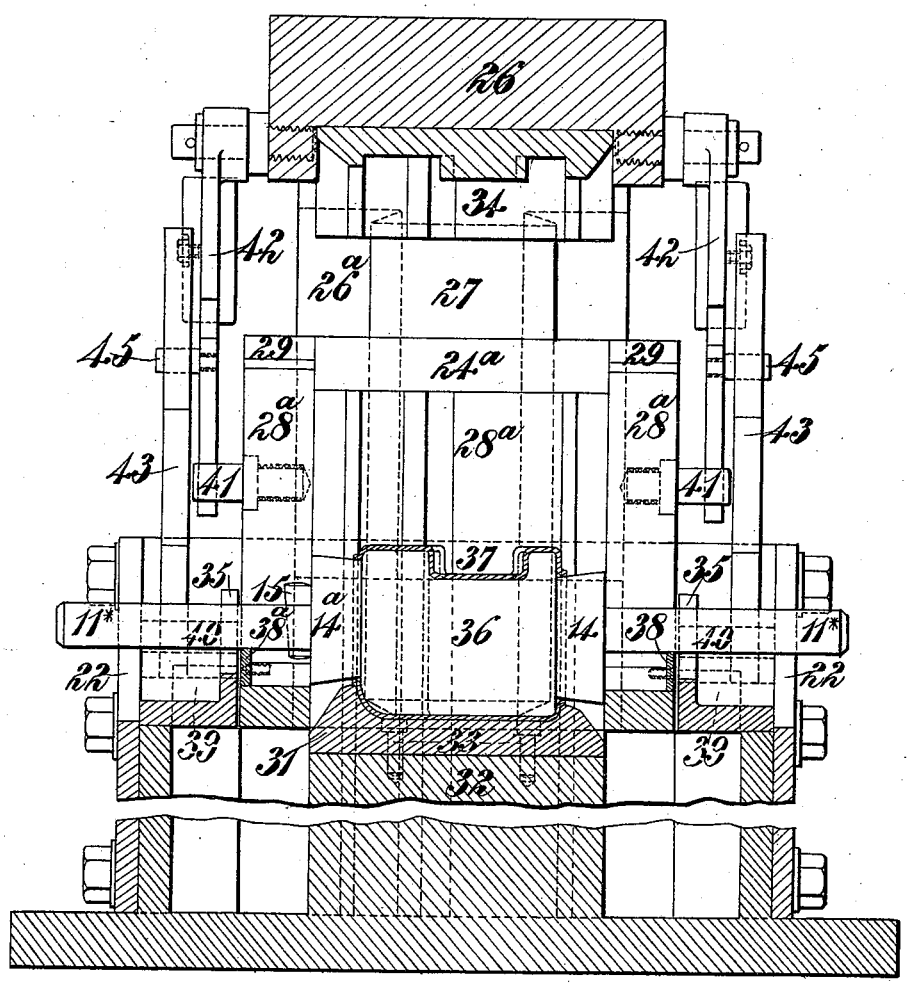
Figure 17:
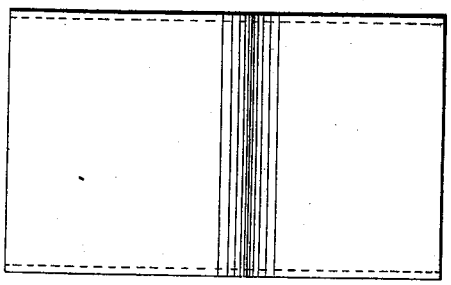
Figure 16:
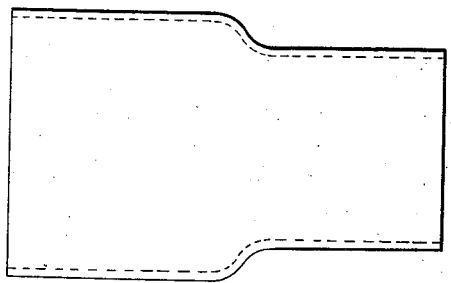
Figure 18:
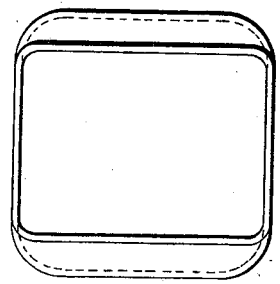
Figure 14:
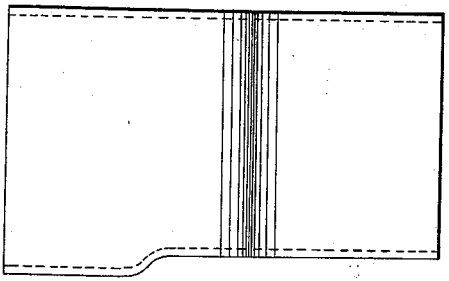
Figure 13:
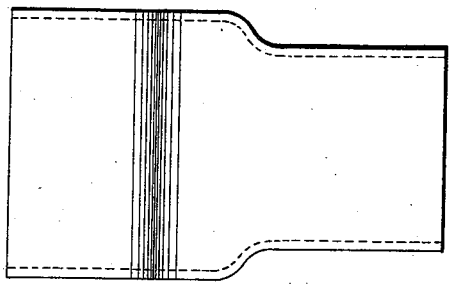
Figure 15:
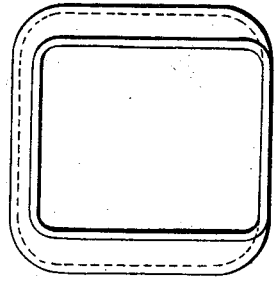
Figure 23:
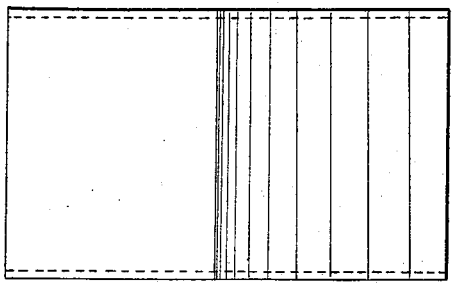
Figure 22:
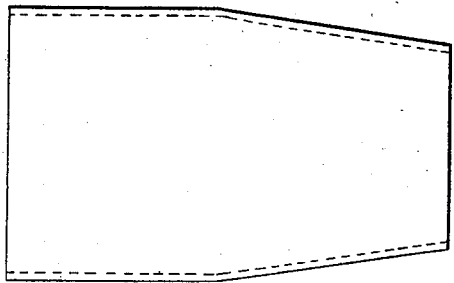
Figure 24:
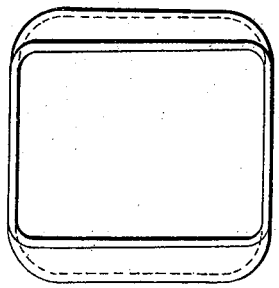
Figure 20:
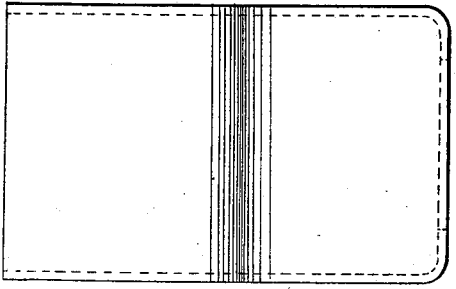
Figure 19:
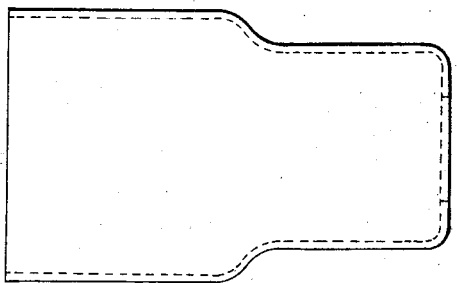
Figure 21:
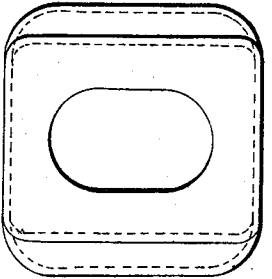
Figure 28:
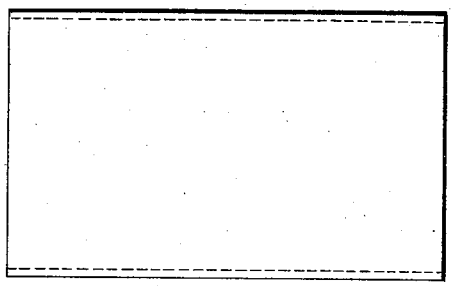
Figure 29:
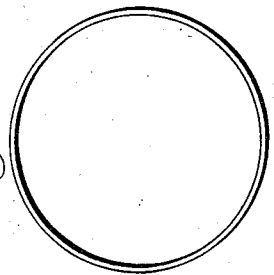
Figure 26:
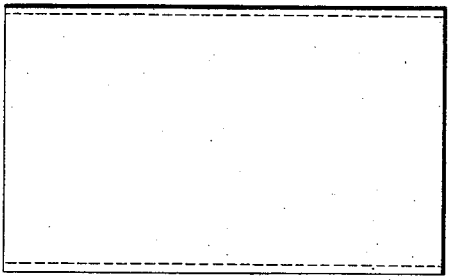
Figure 25:
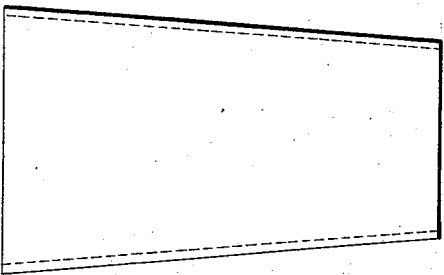
Figure 27:
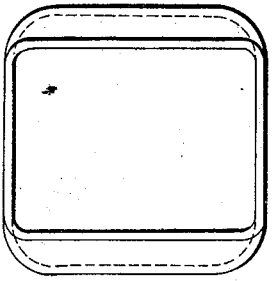

In the accompanying drawings, Figure 1 is a longitudinal section, partly in elevation. Fig. 2 is a plan, and Fig. 3 is an end elevation, to a larger scale, of one form of collapsible mandrel constructed according to this invention. Figs. 4, 5, and 6 are respectively a longitudinal section, partly in elevation, a plan, and a side elevation illustrating a modified construction of collapsible mandrel; and Figs. 7 and 8 are respectively left and right hand elevations thereof. Fig. 9 is a cross-section on the line A B, Fig. 5. Fig. 10 shows, partly in cross-section and partly in end elevation, the outer dies, which, in conjunction with the collapsible mandrel, shown in elevation, serve for pressing the tube placed between them, and shown in cross-section, into an axle-box. The various parts are shown in the position they occupy preparatory to pressing the said tube. Fig. 11 is a longitudinal section on the lines C D of Fig. 10, the collapsible mandrel and tube being shown in the positions they occupy after the pressing operation, the mandrel being shown in side elevation and the pressed axle-box in longitudinal section. Fig. 12 is a horizontal section on the line E F, Fig. 10. Figs. 13 to 29, inclusive, illustrate various forms of welded tubes suitable for conversion into axle-boxes. Figs. 13, 14, and 15 are respectively a plan, side elevation, and end elevation of an open-ended tube suitable for conversion into an axle-box. Figs. 16, 17, and 18 are similar views to Figs. 13, 14, and 15, respectively, illustrating a slightly-modified form of tube in which there is no depression at the top of the tube, as in the latter figures. Figs. 19, 20, and 21 are similar views to Figs. 16, 17, and 18, respectively, but the smaller end of the tube is shown partly closed. Figs. 22, 23, and 24 are respectively a plan, side elevation, and end elevation of a tube that is of uniform cross-section for part of its length and of a gradually-decreasing cross-section for the remainder of its length. Figs. 25, 26, and 27 are similar views to Figs. 22, 23, and 24, respectively, showing a tube of gradually-decreasing cross-section or tapered form from one end to the other. Figs. 28 and 29 are respectively a plan and end elevation of a cylindrical tube.

The exterior of the collapsible mandrel shown in Figs. 1 and 2 is of a form corresponding to the interior of the required axle-box, being for this purpose formed at each side with projections 1 1ª, between which is a groove 2, which, in conjunction with corresponding recesses and projections on the outer side dies, form the axle-guard grooves in the sides of the axle-box. The top of the mandrel also is formed with a recess 2, which, in conjunction with a correspondingly-formed outer top die, forms the top of the axle-box with a recessed spring-seat on the outer side and a bearing on the inside for a journal-brass. The outer portion of this collapsible mandrel comprises four corner-segments 3, 4, 5, and 6, Fig. 3, and four intermediate segments 7, 8, 9, and 10, these segments being fitted around a central tapered boss or spindle 11 (hereinafter called the "core") and interlocked with each other in the manner indicated by the zigzag lines 12.

13 and 13ª are wedge-shaped plates inserted between the upper and lower intermediate pieces 7 and 9 and the core 11, which in the example shown is of rectangular form in cross-section.

14 is a collar fixed to one of the outer end portions 11* of the core.

14ª is another collar loosely mounted upon the smaller tapered end of the core, whereon it is held by a cotter 15.

The exterior form of the collars 14 and 14ª is such as to suit the shape and size of the openings required in the ends of the axle-box. Thus they may be of square, round, or oval form in end view and of parallel or taper form in side view. In the example now being described they are approximately of oval form in end view and of tapered form in side view.

As will be seen, the arrangement is such that when the core is in place and the cotter is tightened up the outer portions of the mandrel will be firmly keyed together, so that they cannot be detached; but upon removing the cotter and collar 14ª the core can be withdrawn from the outer portions of the mandrel, the wedge-shaped plates will be released and can be removed, after which the outer portions of the mandrel can be readily detached from each other by first withdrawing the intermediate parts 8 and 10.

The outer end portions 11* of the core may advantageously be made square, as shown, in order that the mandrel may be readily held in position, as hereinafter described, with its sides vertical ready for the pressing operation. One of these end portions is formed at two opposite sides with vertical recesses 16 for the reception of a holding device whereby the mandrel is held longitudinally in the required position within the outer dies.

17 is a gage-plate of taper form in cross-section. It is fixed to the outer end of the removable collar 14ª and permits of the mandrel or the mandrel and the tube from which the axle-box is to be formed being placed in proper position within the outer dies.

In the modified construction of mandrel shown in Figs. 4 to 9, inclusive, the core is made in two parts 11 11^A, of which the former, 11, is partly cylindrical and partly taper, and the latter, 11^A, which is tapered both externally and internally, is arranged to fit the tapered portion of the former, the arrangement being such that the two portions of the core can be withdrawn from opposite ends of the mandrel. Between the corner-segments 3, 4, 5, and 6 and the intermediate wedge-shaped segments 7, 8, 9, and 10 are additional wedge-shaped segments 7ª, 8ª, 9ª, and 10ª, that are interlocked, as shown, with each other and with the corner-segments. These latter segments are formed with dovetail-shaped projections 3ª, 4ª, 5ª, and 6ª, respectively, that take into correspondingly-formed recesses in the exterior of the core 11, as also does a projection 7ᵇ on the intermediate segment 7. As will be seen, the arrangement is such that when the two parts of the core are inserted in place the outer segments will be firmly locked together and to the core, and that upon withdrawal of the core the intermediate segments will be released and can be readily removed from the inside, after which the additional segments can be removed, thereby leaving the corner-segments free. The collar 14 in this arrangement is shown formed in one with the part 11^A of the core, the outer end of the other part, 11, of the core in conjunction with projecting portions of the segments 3, 7ª, 7, 7ª, and 4 serving as the equivalent of the collar 14ª. (Shown in Figs. 1, 2, and 3.) The outer segments, or some of them, may be made in two lengths with bevel-joints in order to allow for contraction of the axle-box when cooling.

The outer dies are constructed as follows: 18 is a hollow base-plate or support the sides and ends of which are formed with inwardly-projecting vertical extensions 19 19ª, the upper surfaces 19* of which are horizontal. Its ends are also formed with strong vertical extensions 20 20ª, extending above the sides, and each of which is formed with a vertical groove 21 and is strengthened by side flanges 22 and ribs 23.

24 24ª are blocks formed with lateral extensions 24ᵇ, arranged to slide on the horizontal surfaces 19* of the extensions 19ª. Each of these blocks is formed with a downwardly-inclined outer surface 25, bounded by side cheeks 24* and in which is formed a dovetail-shaped groove 25ª.

26 is a vertically-movable plate (hereinafter called the "cap-piece") provided with depending extensions 26ª. The outer sides of each of these extensions is vertical and arranged to slide in the groove 21 in the corresponding extension 20 or 20ª. The inner side of each extension 26ª is inclined to correspond with the outer inclined surface 25 of the corresponding block 24 or 24ª, against which it slides, and is provided with a dovetail-shaped projection 27, arranged to slide in the correspondingly-formed groove 25ª in the adjacent slide-block.

28 28ª are side dies secured to the inner vertical surfaces of the blocks 24 24ª, respectively. The inner surface of each of these side dies is formed with grooves and projections, as shown, to correspond to the external formation which it is desired to impart to the sides of the tube to convert the same into the required axle-box.

29 29, Fig. 10, are projections on the side dies for a purpose hereinafter mentioned.

30 30ª are hard-steel projections carried by the side dies and serving to square out the axle-guard grooves 2*, Fig. 12, formed in the sides of the pressed axle-box.

31 is a plate forming the bottom die, and the upper surface of which corresponds to that of the bottom of the required axle-box. This bottom die is carried by a support 32, which may be made in one with the base-plate 18, as shown in Fig. 11, or separate therefrom, as in Fig. 10. In each case the bottom die is fixed by set-screws 33.

34 is the top die, secured within the cap-piece 26, and the under surface of which is so formed that, in conjunction with the top surface of the mandrel, it will impart the desired formation to the upper part of the tube to form a recessed spring-seat and a bearing to receive a brass for an axle-journal.

35 35 are fixed slotted guides to receive the square ends 11* of the mandrel-core for the purpose of keeping the sides of the mandrel shown at 36 vertical while the tube 37 around the same is being operated upon by the side dies 28 28ª.

38 38ª are side bearers secured to the side dies. They serve to carry the ends of the core and keep the mandrel level ready for the pressing operation.

39 39 are lateral projections on the side dies 31. They are arranged to slide upon the upper surfaces 19* of the extensions 19 and also serve for withdrawing the pressed axle-box from the top die 34.

40 40 are projections from the base-plates 18. They serve as stops for the projections 39, as hereinafter described. To the outer side of each block 24 24ª is fixed a stud 41, corresponding to which is a weighted lever 42 and a fixed bar 43, formed with an inclined surface at 43ª. Each lever 42, which is pivoted to the cap-piece, is formed with a recess 44, adapted to receive the corresponding stud 41, and is provided with a stud 45, that is caused by the action of the weighted lever to bear against the adjacent side of the corresponding bar 43.

A welded tube say of the form shown in Figs. 13, 14, and 15 is pressed to the form of an axle-box by means of apparatus of the kind described in the following manner: The several dies are first moved into their open positions. (Shown in Fig. 10.) The tube shown in full lines in Fig. 10 and in dotted lines in Fig. 12 is heated to a suitable temperature, say a bright red heat, and slipped over the mandrel, and the two are placed in position between the side dies 28 28ª, as shown in Figs. 10 and 12. The cap-piece 26 is then at once forced downward by any suitable means, preferably by the ram of a hydraulic press. As the cap-piece descends its wedge-shaped side portions 26ª by acting against the two blocks 24 24ª cause them and the side dies 28 28ª to move horizontally inward, thus causing the said dies to close upon the tube and mandrel. By this means the sides of the tube are caused to assume the form of the inner surfaces of the side dies and the outer vertical sides of the mandrel between which they are pressed, thereby forming the side projections 1* with internal grooves 2* for axle-guards, and the ends of the tubes are bent inward and partly around the collars 14 and 14ª, so as to partly produce the desired formation of the ends of the axle-box. When the blocks and side dies have finished their inward movement and completed the formation of the sides of the axle-box, they will have left the sliding faces 19* upon which they were previously supported and will have been brought over the recessed portion of the base-plate 18. The side levers 42 will also at this same time have each closed in upon and clasped the corresponding stud 41, so as to hold the blocks and side dies which on the further descent of the cap-piece move downward into the hollow base-plate together with the extensions 26ª of the cap-piece. By this downward movement of the side dies the two steel projections 30 30ª, carried thereby, are caused to descend the axle-guard grooves 2* in the sides of the partly-pressed tube, while the same are still hot, and cause the grooves to become square in cross-section, so as to suit the axle-guards of a wagon or car. When the said grooves have been thus squared and finished, the top and bottom dies 34 and 31, respectively, will come into action, these dies acting simultaneously upon the top and bottom of the tube, while the sides thereof are rigidly held between the side dies, thereby completing the pressing of the tube into an axle-box of the required formation. Immediately the tube has been thus pressed to shape the cap-piece 26 is raised, whereby the side dies, blocks, axle-box, and mandrel are carried up with it until the studs 45 on the levers 42 come into contact with the inclined portions 43ª of the fixed bars 44, which act to press the levers outward and cause them to release the studs 41 and leave the side dies and blocks ready to be moved laterally. Immediately this disengagement of the levers takes place the projections 39 on the side dies come into contact with the projections or stops 40, which prevent the side dies and blocks ascending any farther with the cap-piece, the wedge-shaped extensions 26ª of which then cause the side dies and blocks to slide outward onto the slide-surfaces 19* and into the positions shown in Fig. 10. The pressed axle-box with mandrel will continue to ascend with the top die 34, in which it is fixed, until it comes in contact with the projecting portions 29 of the side dies, which, being now prevented from ascending, act to release the axle-box and mandrel from the top die, so as to permit of their easy withdrawal from between the outer dies when these have assumed the positions shown in Fig. 10. The cotter 15 of the collapsible mandrel is then removed and the core of the mandrel withdrawn, whereupon the intermediate wedge-shaped segments of the outer portion of the mandrel will fall, or can be moved inward, and are removed, thus freeing the corner-segments which are then withdrawn. The axle-box thus pressed to shape is ready, after the ends have been suitably trimmed if necessary, to receive the journal-brass, grease-box, or other attachments.

As will be obvious, axle-boxes can be constructed in various forms in the manner hereinbefore described, the tubes from which they are to be formed and the mandrel and outer dies being suitably formed for the purpose.

What I claim is—

1. Apparatus for the manufacture of axle-boxes, comprising a rigid or non-expanding collapsible mandrel corresponding to the desired form of axle-box and composed of a core and interlocked segments, a pair of laterally-movable dies provided with studs, weighted levers engaging said studs, vertical supports for said dies, top and bottom dies, and means for laterally compressing a metal tube on said collapsible mandrel, forming the desired axle-grooves in said tube and vertically compressing said tube on the collapsible mandrel between said top and bottom dies while the tube is held by the laterally-movable dies, substantially as described.

2. Apparatus for the manufacture of axle-boxes comprising a recessed base-plate formed with vertical supports, a pair of laterally-movable dies adapted to slide on said supports and to descend into said hollow base-plate when not carried by said supports, a bottom die carried by said base-plate, a vertically-movable cap-piece having wedge-shaped extensions adapted to reciprocate said laterally-movable dies, a top die carried by said movable cap-piece, a collapsible mandrel or inner die supported between said lateral and top and bottom dies by said base-plate, studs fixed to said laterally-movable dies, weighted levers pivoted to said cap-piece and adapted to engage said studs and means for permitting said levers to engage said studs and for disengaging the levers therefrom at the required times, substantially as herein described for the purposes specified.

3. Apparatus for the manufacture of axle-boxes comprising a recessed base-plate formed with vertical supports, a pair of laterally-movable dies adapted to slide on said supports and to descend into said base-plate when not carried by said supports, blocks carrying said dies, and each having its outer end face downwardly inclined, a bottom die carried by said base-plate, a vertically-movable cap-piece having wedge-shaped extensions arranged to act against the inclined surfaces of said blocks, a top die carried by said cap-piece, a collapsible mandrel or inner die supported between said lateral and top and bottom dies by said base-plate, projections 29 and 30 carried by said laterally-movable dies, studs fixed to said laterally-movable dies, weighted levers pivoted to said cap-piece formed with recesses adapted to engage said studs and each provided with a pin 45, and fixed rods 43 each having an inclined surface adapted to act against the pin of the corresponding weighted lever substantially as herein described for the purpose specified.

In testimony whereof I have signed my name to this specification in the presence of two subscribing witnesses.

SAMSON FOX.

Witnesses:
A. L. CROFT,
J. W. HAWLEY.